United States Patent [19]
Lich

[11] 3,774,549
[45] Nov. 27, 1973

[54] FLUID SPRUNG RAILWAY TRUCK

[75] Inventor: Richard L. Lich, Town and Country, Mo.

[73] Assignee: General Steel Industries, Inc., St. Louis, Mo.

[22] Filed: Nov. 15, 1971

[21] Appl. No.: 198,702

[52] U.S. Cl. ...... 105/182 R, 105/197 B, 105/199 R, 105/206 R
[51] Int. Cl. .......... B61f 3/08, B61f 5/10, B61f 5/14
[58] Field of Search .................... 105/197 B, 199 R, 105/182 R, 197 B, 199 R, 206 R

[56] References Cited
UNITED STATES PATENTS

| | | | |
|---|---|---|---|
| 3,646,893 | 3/1972 | Sundby | 105/197 B X |
| 3,548,755 | 12/1970 | Lich | 105/199 R |
| 3,570,408 | 3/1971 | Lich | 105/199 R X |
| 3,231,257 | 1/1966 | Lich | 105/199 R X |
| 3,523,505 | 8/1970 | Lich | 105/197 B |

*Primary Examiner*—Robert G. Sheridan
*Assistant Examiner*—Howard Beltran
*Attorney*—Bedell and Burgess

[57] ABSTRACT

A railway vehicle includes a truck having a pair of wheeled axles, truck framing supported on the axles, a vehicle body carried on the framing by separate flexible wall pneumatic spring devices seated on opposite sides of the truck framing. The truck framing is connected to the body to transmit longitudinal forces from the one to the other while accommodating their relative transverse and swivel movements. The spring devices are secured to the truck framing and have bearing means at their upper ends in slidable engagement with horizontal bearing surfaces on the vehicle body, the bearing means being vertically apertured to permit pressurized air from the spring devices to bear against the bearing surfaces. The bearing means includes a reservoir for the flexible wall springs, eliminating the need for apertures in the body bearing surface to provide for passage of air from body mounted reservoirs and the springs. Longitudinal links hold the bearing means against substantial longitudinal movement relative to the truck framing and additional generally transverse linkage means restrict the bearing means to arcuate movement about a vertical axis substantially at the intersection of the transverse center line of the truck and the longitudinal center line of the body.

13 Claims, 4 Drawing Figures

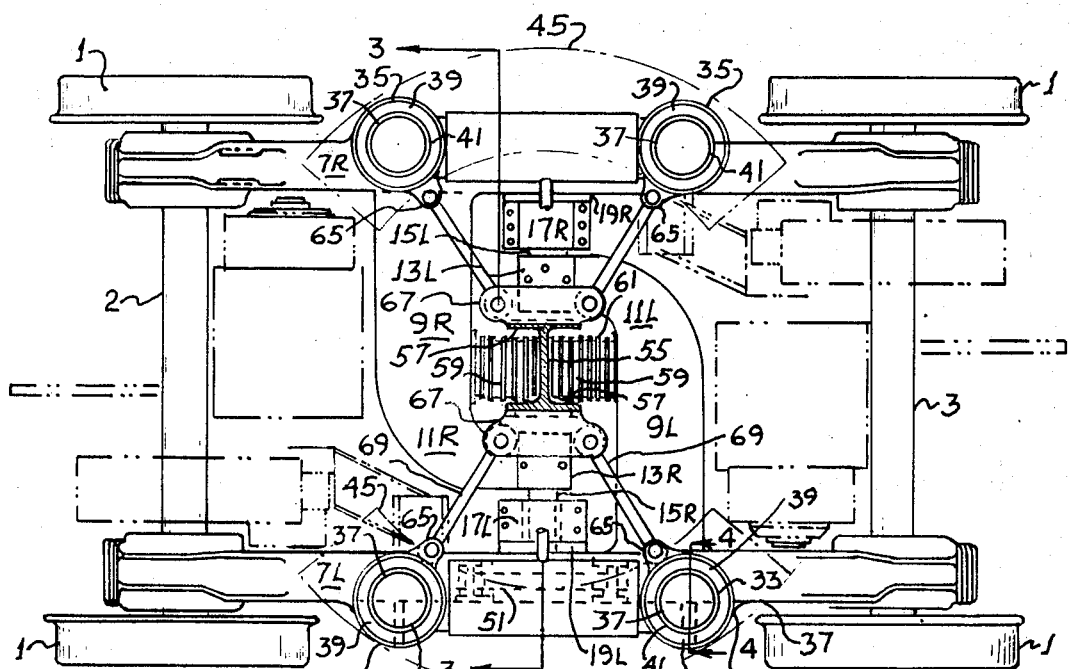
FIG. 1.
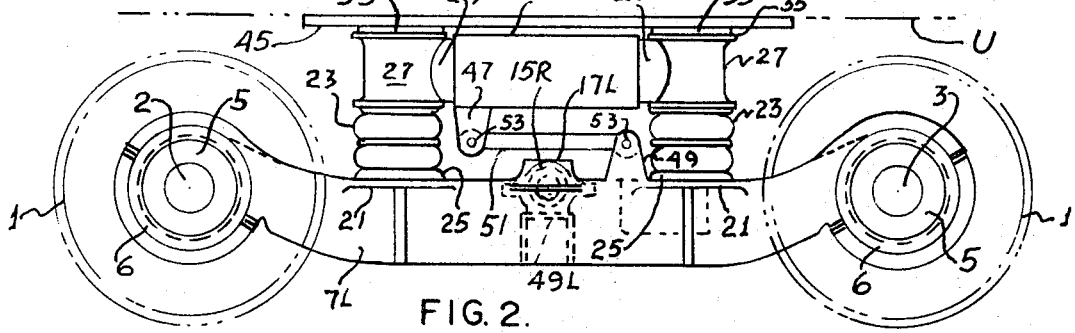
FIG. 2.
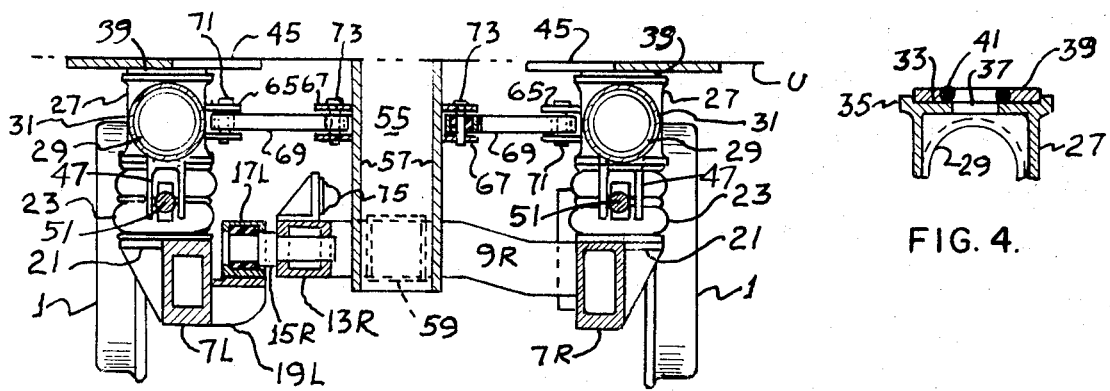
FIG. 3.
FIG. 4.
INVENTOR:
RICHARD L. LICH
BY: Bedell & Burgess
ATTORNEYS.

FLUID SPRUNG RAILWAY TRUCK

BACKGROUND OF THE INVENTION

1. Field of the Invention: The invention relates to railway rolling stock and consists particularly in vehicle suspensions including bolsterless trucks with penumatic springs and pneumatic bearings.

2. Description of the Prior Art: Known trucks of the type having pneumatic springs and bearings have incorporated a bolster carried by the springs and pivoted to the car underframe on a vertical axis at the truck center, to fix the position of the springs in the horizontal plane. In such trucks the spring reservoirs have been in the car underframe, communication with the springs being through a hole in the body side bearing registrable with apertures in the top of the springs. This necessitates an effective seal around the aperture and limits the swivel angle of the truck because of the need for keeping the side bearing plate holes and the spring apertures in registry at all times.

SUMMARY OF THE INVENTION

The invention provides railway vehicle suspensions in which the vehicle body is supported on the trucks by slidable mounting directly on spring-supported bearings without the interposition of a bolster between the springs and body structure. This object is achieved by fixing the lower end of the upright spring devices to the truck structure, and movably securing the upper end of the spring devices to the vehicle body structure by generally transverse linkage systems and to the truck structure by longitudinal anchor links. Other objects include the elimination of the necessity of constant registry between holes in the body bearing plates and apertures in the spring bearing members where pneumatic bearings are used, by providing reservoirs fixedly secured to the springs and movable with the springs rather than with the bearing plates. Another object is to combine these features in a truck of simple construction in which the framing comprises a pair of side frames each formed with an inboard stub transom pivotally connected to the opposite side frame on the transverse axis of the truck.

BREIF DESCRIPTION OF THE DRAWING:

FIG. 1 is a top view of a railway vehicle truck and a horizontal sectional view of a part of the supported car body incorporating one form of the invention.

FIG. 2 is a side elevational view of the truck illustrated in FIG. 1.

FIG. 3 is a transverse vertical sectional view along line 3—3 of FIG. 1.

FIG. 4 is a transverse vertical sectional view along line 4—4 of FIG. 2.

DESCRIPTION OF THE PREFERRED EMBODIMENT:

The numeral 1 denotes railway flanged wheels mounted in gauged pairs on longitudinally spaced railway axles 2 and 3. Inboard of wheels 1, axles 2 and 3 are rotatably received in journal boxes 5, preferably inboard of wheels 1.

A pair of parallel, transversely spaced, longitudinally extending side frames are supported at their ends on journal boxes 5, to which they are secured by elastomeric grommets 6. Side frames 7L and 7R are formed respectively with integral inboard stub transoms 9L and 9R offset longitudinally of the truck from each other equal distances fore and aft of the truck center, with their free end portions curved as at 11L and 11R toward the truck center adjacent the opposite side frame. Their respective extremities 13L and 13R rigidly mount trunnion pins 15L and 15R aligned with each other on the transverse center line of the truck. Trunnion pins 15L and 15R project transversely toward the opposite side frame and are pivotally received respectively in bearings 17R and 17L respectively, mounted inboard of their respective side frames on side frame brackets 19L and 19R. To eliminate metal-to-metal contact and wear, and facilitate pivoting of the trunnion pins in the bearings, an elastomeric bushing is compressed into each bearing surrounding the trunnion pin therein. With this arrangement, side frames 7R and 7L are enabled to accommodate themselves to vertical differences in the track rails and thereby maintain substantially equal distribution of the truck load to the wheels, by tilting relative to each other about the common axis of trunnion pins 15R and 15L.

Between the axles, side frames 7L and 7R are depressed to a substantially lower level than their axle-supported end portions, and are formed respectively with a pair of outboard spring-support shelves 21 coplanar with the top of the respective side frames and spaced apart symmetrically longitudinally of the truck with respect to the transverse center line of the truck.

A spring device at each side of the truck comprises a pair of upright flexible wall pneumatic springs 23 of the bellows type seated on and secured respectively, by clamping rings 25 to the upper surfaces of shelves 21 and adjacent portions of the side frame tops. At their tops, springs 23 are secured respectively to hollow rigidwall bearing members 27, of generally vertical cylindrical shape with cylindrical branches 29 projecting toward each other longitudinally of the truck, and connected to each other by a section of pipe 31 to form a common reservoir for both springs 23.

The horizontal top wall 33 of bearing member 27 is formed with an upstanding peripheral flange 35 and is centrally apertured at 37. A flat annulus 39 of Teflon or other similarly tough material having low surface friction characteristics is seated on top wall 33 and a sealing ring or grommet 41 of elastomeric material is seated on top wall 33 along the margin of aperture 37.

Body underframe structure U is provided with flat downwardly facing substantially imperforate bearing plates 45 arcuate in plan about the truck center and slidably seated on spring device bearing member annuli 33, in compressive engagement with elastomeric sealing rings 41. When air under suitable pressure is introduced into the spring devices comprising springs 23, bearing members 27 and reservoirs 31, it acts through bearing apertures 37 against bearing plates 45 to relieve annuli 33 of some of the load and thereby reduce resistance to sliding.

To prevent deflection in shear longitudinally of the truck of spring bellows 23 and corresponding shifting of bearing members 27 and reservoirs 31, each of the latter is formed at one end with a depending bracket 47 and the respective side frame with an upstanding bracket 49 beneath the opposite end of rservoir 31, and a longitudinal anchor link 51 is connected by universal pivots to brackets 47 and 49 so that it can accommodate vertical and transverse movements of bearings 27 and reservoirs 31 on springs 23 relative to the respective side frame 7L or 7R, but prevents their relative longitudinal movement.

For transmitting longitudinal acceleration and retardation forces between the truck and the body, body underframe structure U may mount a depending vertical post of I cross section having a transverse web 55 and longitudinal flanges 57. Post 55, 57 projects into the space between stub transoms 9L and 9R and sandwich devices comprising transverse elastomeric pads 59 and interlined metal plates 61 are compressed longitudinally between web 55 and transoms 9L and 9R respectively.

In order to eliminate a bolster, yet provide for arcuate movement of bearing members 27 about the center of the truck when the truck swivels, each bearing member 27 is formed with an inwardly extending pivot bracket 65, and outwardly extending double pivot brackets 67 are secured to flanges 57 of post 55, 57, and a pair of generally transverse links 69 are pivotally connected at their outer ends by elastomerically bushed pivots 71 to brackets 65 and at their inner ends by similar pivots 73 to brackets 67. Pivots 73 are spaced from each other longitudinally of the truck a substantially shorter distance than pivots 71 so that links 69 converge, with their projections intersecting at the center of post 55, 57, which thus functions as the effective pivot center for bearing members 27.

For resiliently limiting lateral movements of the body on the truck, permitted by shear in bellows 23, inwardly facing elastomeric bumpers 75 are mounted on transom ends 13L and 13R in facing spaced relation with flanges 57 of post 55, 57.

Operation of the suspension is as follows: As the vehicle, equipped with a pair of identical trucks, moves along tangent track, compressed air introduced into spring devices 23, 27, 31 through reservoirs 31 keeps springs 23 inflated to predetermined heights, and bears directly against body side bearing plates 45 to relieve the annuli 39 of a part of the body load and thus facilitate truck swivel on curved track. Longitudinal traction forces are transmitted from the truck to the body by the resistance to compression of elastomeric pads 59, which, however, yield freely in shear vertically and transversely of the truck to accommodate vertical action of springs 23 as well as transvers shearing of springs 23, longitudinal shear of springs 23 and corresponding movement of bearing members 27 being prevented by anchor links 51. When the vehicle enters curved trackage, yielding of pads 59 permits the trucks to swivel about the center of post 55, 57 as an axis, and the converging arrangement of links 69 causes bearing members 27, held against longitudinal movement with respect to side frames 7L and 7R, to describe arcs about this axis, swivel being facilitated by the reduction in frictional resistance effected by air pressure through bearing member apertures 37 against body bearing plates 45. Since air is provided to the springs through reservoirs 31 instead of through a body mounted reservoir, bearing plates 45 and the bearing member apertures, there is no need of maintaining holes in bearing plate 45 and the bearing member apertures in registry and thus severely limiting the permissible swivel angle.

The details of the contruction disclosed herein may be modified substantially without departing from the spirit of the invention and the exclusive use of any modifications as come within the scope of the appended claims is contemplated.

I claim:

1. In a railway vehicle, a truck comprising a pair of wheeled axles spaced apart longitudinally of the truck, truck framing supported on said axles, vehicle body structure positioned above said truck framing, separate upright flexible wall pneumatic spring devices seated on said truck framing at the opposite sides thereof intermediate said axles, downwardly facing bearing surfaces on said body structure, said spring devices including an upright flexible wall member secured at its lower end to said truck framing, and an upwardly facing bearing member secured to the upper end of said flexible wall member and in slidable engagement with the horizontal bearing surface, said bearing member being vertically apertured to permit pressured air from said flexible wall members to bear against downwardly facing bearing surfaces, means connected said truck framing to said body structure to transmit longitudinal forces between said framing and said structure while accommodating relative transverse and swivel movements of said body structure and said truck framing, said connecting means occupying a substantial area in the region of the intersection of the transverse center line of the truck and the longitudinal center line of the body, linkage means holding said bearing member against substantial longitudinal movement relative to said truck framing and additional linkage means restricting said bearing member to arcuate movement about a vertical axis substantially at the intersection of the transverse center line of the truck and the longitudinal center line of the body, said additional linkage means comprising a pair of links at each side of the truck pivotally connected at their outer ends to said bearing members and at their inner ends to said body structure at points transversely outboard of the center of said body structure and clear of said connecting means, said inboard ends of said links being spaced apart longitudinally of the truck and their outboard ends being spaced apart a greater distance longitudinally of the truck than their inboard ends whereby the projections of their longitudinal axes intersect at said vertical axis.

2. In a railway Vehicle according to claim 1, each of said spring devices comprising a pair of longitudinally spaced flexible wall members, said bearing means comprising rigid bearing elements on said springs and an elongated hollow rigidly connecting said caps and forming a reservoir for said springs.

3. In a railway vehicle according to claim 1, said truck framing including a pair of transverse transom members positioned symmetrically fore and aft of the truck center, said connecting means comprising a vertical post depending from said body structure into the space between said transoms, and elastomeric elements compressed longitudinally of the truck between said post and said transoms, the inner pivotal connections of said links being located transversely outboard of said post.

4. In the railway vehicle according to claim 1, said truck framing comprising a pair of longitudinally extending side frames supportd at their ends on said axles and each formed with a transversely extending transom, said transoms being equally offset lengthwise of the truck in opposite directions from the transverse center line of the truck and each having an end portion intersecting the transverse center line adjacent the opposite side frame and there pivotally connected on the transverse center line as an axis to the opposite side frame.

5. In a railway vehicle according to claim 1, each of said bearing members having a horizontal top surface surrounding said aperture, there being a pad of low surface friction material seated on said top surface and in slidable engagement with said downwardly facing body bearing surface.

6. In a railway vehicle according to claim 5, each said pad being slightly spaced uniformly from the periphery of the respective aperture and an elastomeric grommet is seated in the remaining marginal space and compressed into sealing engagement with said downwardly facing body bearing surface.

7. A railway vehicle truck comprising a pair of wheeled axles spaced apart longitudinally of the truck, truck framing supported on said axles, separate pneumatic spring devices seated on said framing at the opposite sides thereof intermedaite said axles, said spring devices including an upright flexible wall member secured to said framing and an upwardly facing bearing member secured to the top of said flexible wall member, said bearing member being formed with a vertical aperture throughout its height to provide an upwardly facing air bearing on said bearing member and including in addition to said aperture a rigid wall air reservoir in communication with said flexible wall member, said reservoir forming the sole means for introducting air to said flexible wall member, and means retaining said bearing member against movement longitudinally of said truck frame.

8. A railway vehicle truck according to claim 7 wherein said bearing members have a horizontal top surface surrounding said aperture, there being a pad of low surface friction material seated on said top surface and surrounding said aperture.

9. A railway vehicle truck according to claim 8 wherein said pad is slightly spaced uniformly from the periphery of said aperture and an elastomeric grommet is seated in the remaining marginal space.

10. A railway vehicle truck according to claim 7 wherein there are a pair of said flexible wall members at each side of the truck spaced apart lengthwise of the truck and said bearing member includes separate bearing parts on each of said springs, said reservoir extending longitudinally of the truck between said bearing parts and being rigidly connected at its ends to said bearing parts.

11. A railway vehicle truck according to claim 10 wherein each said retaining means comprises a longitudinal anchor link in the space between the bottom of said reservoir, the top of said truck framing and said spaced flexible wall members, said link being pivoted at its respective ends to said bearing member and said truck framing.

12. A railway vehicle truck according to claim 11 including at each side a depending bracket from said reservoir and an upstanding bracket on said frame, said anchor link respective ends being pivotally connected to said bracket.

13. A railway truck according to claim 7 in which said truck framing comprises a pair of longitudinally extending side frames supported at their ends on said axles and each formed with a transversely extending transom, said transom being equally offset lengthwise of the truck in opposite directions from the transverse center line of the truck and each having an end portion intersecting the transverse center line adjacent the opposite side frame and then pivotally connected on the transverse center line as an axis to the opposite side frame.

* * * * *